(12) United States Patent
Updike et al.

(10) Patent No.: US 7,128,260 B1
(45) Date of Patent: Oct. 31, 2006

(54) METHODS OF AN OPERATOR HANDLING A FAULT CONDITION IN AN IMAGE-BASED SELF-SERVICE CHECK DEPOSITING TERMINAL

(75) Inventors: Malon S. Updike, Dayton, OH (US); Bradley L. Lozier, Centerville, OH (US); John D. Morgan, Charlotte, NC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/159,081

(22) Filed: Jun. 22, 2005

(51) Int. Cl.
*G07F 19/00* (2006.01)
(52) U.S. Cl. .................. 235/379; 235/381; 705/45; 340/3.43
(58) Field of Classification Search ............ 235/379, 235/381; 705/43–45; 340/3.42–3.44
See application file for complete search history.

(56) References Cited

U.S. PATENT DOCUMENTS 5,739,509 A * 4/1998 Watanabe ............... 235/379
5,971,388 A * 10/1999 Hattori et al. ........... 271/10.03
2003/0009492 A1 * 1/2003 Gawne ................ 707/500

* cited by examiner

*Primary Examiner*—Jared J. Fureman
*Assistant Examiner*—Kristy A. Haupt
(74) *Attorney, Agent, or Firm*—Michael Chan

(57) ABSTRACT

A method is provided of an operator who is other than a check depositing customer handling a fault condition in an image-based check depositing terminal. The method comprises inserting a non-customer identification card into a card reader of the terminal to allow the card reader to read from the card data which is associated with a financial institution, removing a check along a check transport path which extends between a check input slot and an image capture device of the terminal, and inserting the removed check into the check input slot to allow the check to be transported along the check transport path past the image capture device to capture an image of the check so that the image of the check can be electronically transmitted together with the data which is associated with the financial institution. The method may further comprise verifying that the check is transported into a check storage bin after the check has been transported past the image capture device. The method may further comprise removing the non-customer identification card from the card reader after the operator has verified that the check has been transported into the check storage bin.

17 Claims, 8 Drawing Sheets

METHODS OF AN OPERATOR HANDLING A FAULT CONDITION IN AN IMAGE-BASED SELF-SERVICE CHECK DEPOSITING TERMINAL

BACKGROUND

The present invention relates to fault conditions in self-service terminals, and is particularly directed to a method of an operator handling a fault condition in an image-based self-service check depositing terminal, such as an image-based check depositing automated teller machine (ATM).

A typical non-image-based check depositing ATM allows an ATM customer to deposit a check (without having to place the check in any deposit envelope) in a public access, unattended environment. To deposit a check, an ATM customer inserts a customer identification card through a user card slot at the ATM, enters the amount of the check being deposited, and inserts the check through a check slot. A check transport mechanism receives the inserted check and transports the check in a forward direction along a check transport path to a number of locations within the ATM to process the check. If the check is not accepted for deposit, the check is returned to the ATM customer via the check slot. If the check is accepted for deposit, the amount of the check is deposited into the ATM customer's account and the check is transported to and stored in a storage bin within the ATM. An endorser printer prints an endorsement onto the check as the check is being transported to the storage bin.

Checks stored in the storage bin within the ATM are periodically picked up and physically transported via courier to a back office facility of a financial institution. At the back office facility, the checks are prepared at a document preparation workstation for subsequent processing in an image-based check processing system located at the back office facility. In a first pass of checks through the image-based check processing system, check image data which is representative of images of the checks is captured. Then in a second pass of checks through an image-based check processing system, the checks are encoded and sorted and matched up with their corresponding check image data which was previously captured during the first pass of checks. The second pass of checks may be made through either the same image-based check processing system that the first pass of checks was made or a different image-based check processing system. Checks are processed in the first and second passes through the image-based check processing system(s) for purpose of clearing checks between financial institutions, as is known.

As an alternative to capturing check image data in a first pass of checks through an image-based check processing system located at the back office facility (which requires the checks to be physically transported from the ATM to the back office facility before the first pass of checks can be performed), proposals have been made to initially capture check image data at the ATM. An image-based check depositing ATM is needed to capture check image data which is representative of checks deposited at the ATM. In a typical image-based check depositing ATM, check image data is initially captured in a "first pass" of checks through the ATM. The remotely-captured check image data is then sent electronically to the back office facility. At a later time, the checks are picked up at the ATM and physically transported via courier to the back office facility. Then, in a "second pass" of checks through an image-based check processing system located at the back office facility, the checks are matched up with their corresponding check image data which was previously captured at the ATM. The checks are then further processed as required.

From time to time, a fault condition may occur such that a check image is not captured during a check depositing transaction. For example, the check may become jammed in an ATM (whether the ATM is of the non-image-based type or of the image-based type) while an ATM customer is conducting a check depositing transaction at the ATM. When this occurs, a responsible operator is dispatched to the particular ATM to clear the document jam condition. The responsible operator may be a bank branch employee, for example. As another example, the responsible operator may be an employee of a third party transit company.

If the document jam condition occurred in a non-image-based type of check depositing ATM, then the responsible operator would clear the document jam condition by typically removing the jammed check and then placing the removed check into the storage bin that the check would have been transported if the document jam condition had not occurred. After the document jam condition is cleared, the non-image-based check depositing ATM is placed back into operation and is ready to process the next ATM transaction for the next ATM customer.

However, if the document jam condition occurred in an image-based type of check depositing ATM, then problems may arise during later check processing steps at the back office facility. If the removed check was imaged at the ATM before the document jam condition occurred, then there should be no problem during later check processing steps because check image data associated with this particular check has been captured and transmitted to the back office facility. In this case, the responsible operator can simply place the check into the storage bin that the check would have been transported if the document jam condition had not occurred. This check along with other checks in the storage bin are picked up at a later time and transported to the back office facility for further processing.

On the other hand, if the removed check was not imaged at the ATM before the document jam condition occurred, then there will be a problem during later check processing steps at the back office facility because check image data associated with this particular check has not been captured and, therefore, could not have been transmitted to the back office facility. If the responsible operator places the removed check into the storage bin, this would not correct the problem that has been created because an image of this check still has not been captured and transmitted to the back office facility. Further, when an image of the check has not been captured before the document jam condition occurred, the responsible operator may not know what to do with the check that has been removed to clear the document jam condition.

SUMMARY

In accordance with an embodiment of the present invention, a method is provided of an operator who is other than a check depositing customer handling a fault condition in an image-based check depositing terminal. The method comprises inserting a non-customer identification card into a card reader of the terminal to allow the card reader to read from the card data which is associated with a financial institution, removing a check along a check transport path which extends between a check input slot and an image capture device of the terminal, and inserting the removed check into the check input slot to allow the check to be transported along the check transport path past the image capture device to capture an image of the check so that the image of the check can be electronically transmitted together with the data which is associated with the financial institution. The method may further comprise verifying that the check is transported into a check storage bin after the check has been transported past the image capture device. The method may further comprise removing the non-customer identification card from the card reader after the operator has verified that the check has been transported into the check storage bin.

DETAILED DESCRIPTION

Figure 1:
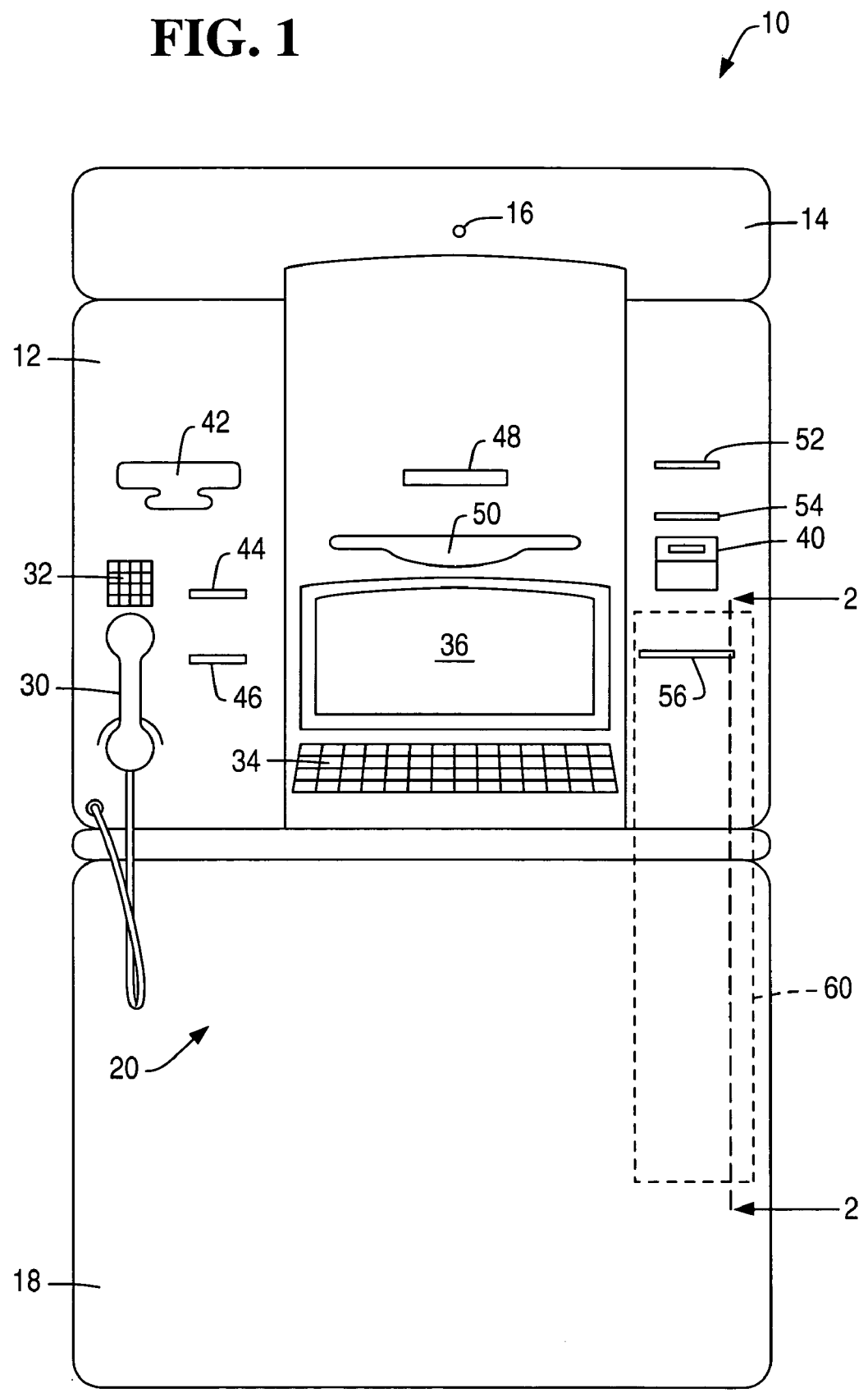
FIG. 1 is a pictorial diagram of an image-based check depositing ATM embodying the present invention.

The present invention is directed to a method of an operator handling a fault condition in an image-based self-service check depositing terminal, such as an image-based check depositing automated teller machine (ATM). Referring to FIG. 1, an image-based self-service check depositing terminal 10 in the form of an image-based check depositing ATM is illustrated. The check depositing ATM 10 comprises a fascia 12 pivotably coupled to a chassis (not shown), an upper panel 14 mounted to the chassis and defining an aperture 16 through which a camera (not shown) images a customer of the ATM 10, and a lower panel 18 hingeably coupled to the chassis so that the lower panel 18 can be opened to reveal a safe (not shown) mounted in the chassis. When the lower panel 18 is open, the fascia 12 can be pivoted upwards to reveal ATM modules mounted within the chassis.

The fascia 12 and lower panel 18 provide a user interface 20 for allowing an ATM customer to execute a transaction. The fascia 12 includes a handset 30 and a telephone keypad 32 for allowing an ATM customer to contact a remote operator (not shown) typically located in a call center (not shown). The fascia 12 also includes an encrypting keyboard 34 for allowing an ATM customer to enter transaction details, and a display 36 for presenting screens to an ATM customer. The fascia 12 also defines eight slots for receiving and dispensing media items, and a tray 40 into which coins can be dispensed. The slots include a money order printer slot 42, a bunch note input slot 44, a bunch note exit slot 46, a statement output slot 48, a cash dispense slot 50, a card reader slot 52, a card issue slot 54, and a check input/output slot 56. The slots 42 to 56 and tray 40 are arranged so that when the fascia 12 is closed, the slots and tray align with corresponding ATM modules mounted within the ATM's chassis (not shown). The user interface features described above are all provided on an NCR PERSONAS (trade mark) 5878 financial services center ATM, available from NCR Financial. Solutions Group Limited, Discovery Centre, 3 Fulton Road, Dundee, DD2 4SW, Scotland.

Figure 2:
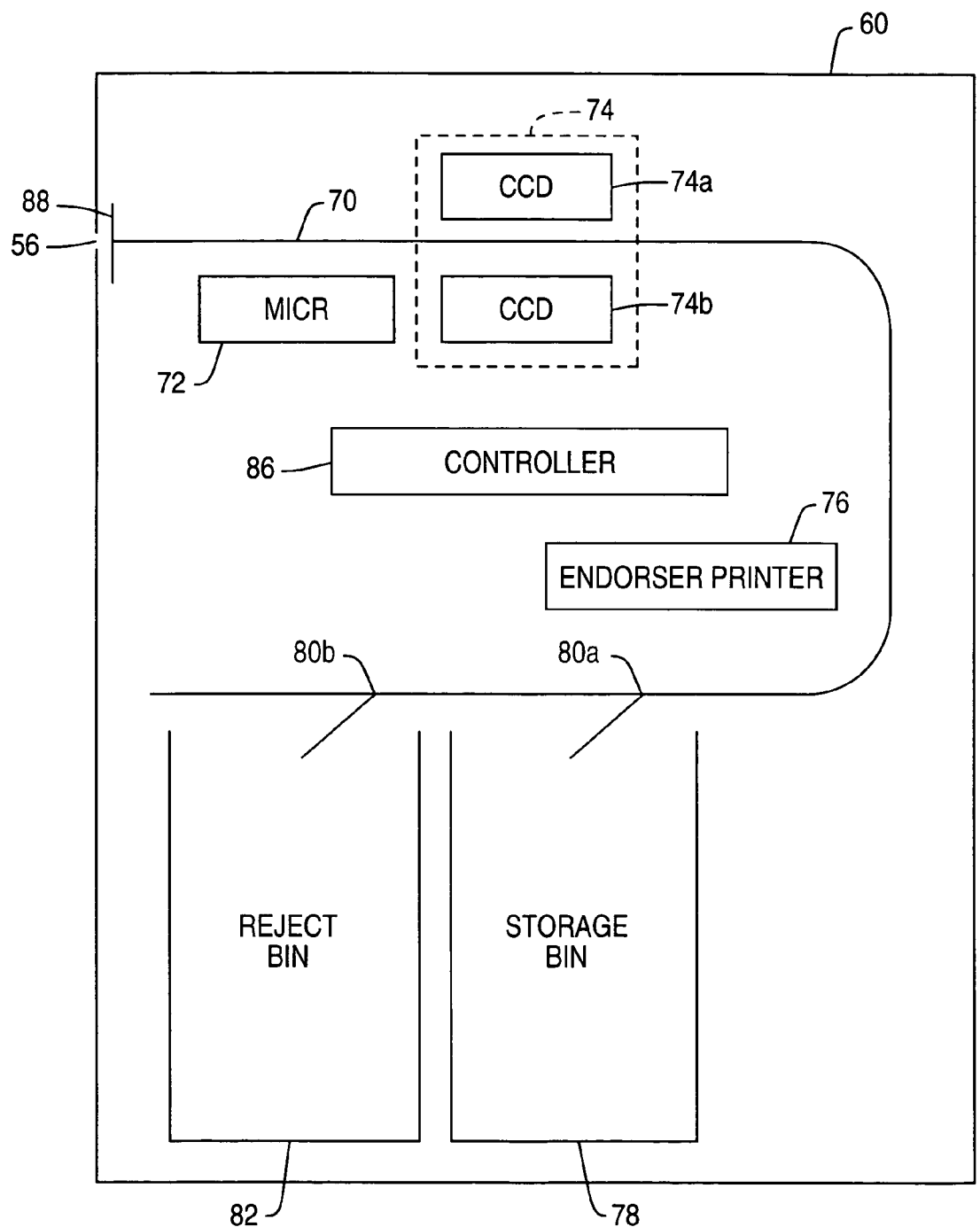
FIG. 2 is a simplified schematic sectional diagram, taken approximately along line 2—2 in FIG. 1, and showing a part (the check processing module) of the ATM of FIG. 1.
Figure 3:
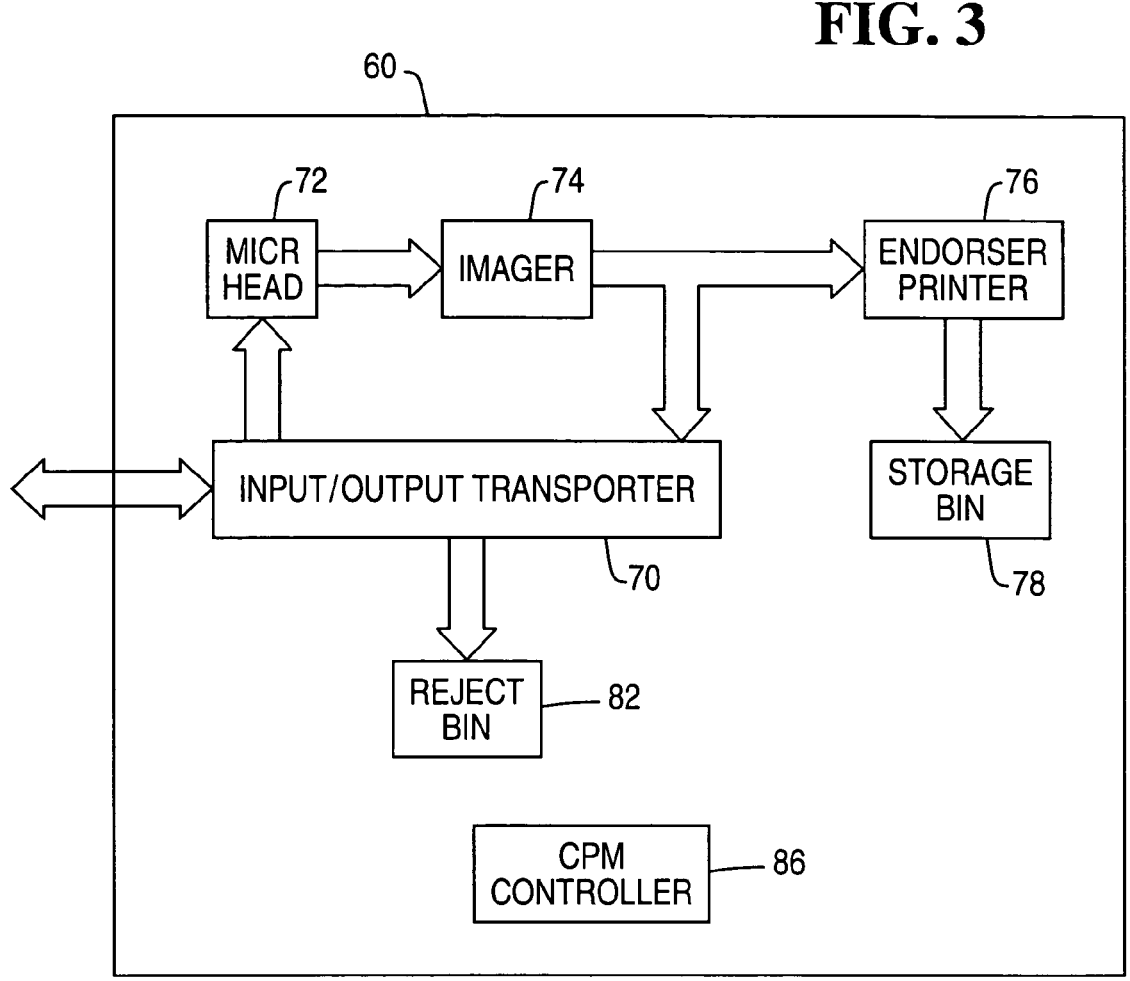
FIG. 3 is a block diagram of the check processing module of FIG. 2.

A check processing module (CPM) 60 will now be described with reference to FIG. 2 and FIG. 3. FIG. 2 is a simplified schematic sectional diagram (along line 2—2 in FIG. 1) showing part of the fascia 12 and lower panel 18, and the main parts of the CPM 60. FIG. 3 is a block diagram illustrating the main elements in the CPM 60. The CPM 60 is a modified version of a conventional check processing module, such as the check processing module provided with the PERSONAS (trade mark) 5878 NCR ATM.

The CPM 60 comprises the following elements: a check input/output transport mechanism 70 including an alignment mechanism for aligning a check; a magnetic ink recognition character (MICR) head 72 for reading magnetic details on a code line of a check; an imager 74 including an upper 74a and lower 74b CCD camera for capturing an image of each side of a check (front and rear); a printer 76 for endorsing a check; a storage bin 78 for storing processed checks; and a reject bin 82 for storing rejected checks. The transport mechanism 70 includes two divert gates 80a, 80b for diverting checks to either the storage bin 78 or the reject bin 82. The elements are conventional and will not be described in detail herein. The CPM 60 also includes a controller 86 for controlling the operation of the elements within the CPM 60. The CPM 60 also includes an entrance shutter 88 for opening and closing the check input/output slot 56.

A typical check depositing transaction will now be described with reference to FIG. 4 which is a flowchart 100 illustrating the steps involved in a check depositing transaction, and also with reference to FIGS. 1 to 3. In this transaction, the ATM customer enters a customer identification card into the card reader slot 52 (steps 102 and 104), selects "check depositing" from a list of transaction options presented on the display 36, enters the amount of the check via the keyboard 34, and inserts the check to be deposited through the check input/output slot 56 (step 106). The controller 86 receives the amount of the check (step 108), and opens the slot shutter 88. The transport mechanism 70 receives the check and transports the received check (step 110) to the MICR head 72 where the MICR codeline on the check is read (step 112).

A determination is made (step 114) as to whether the MICR codeline can be read from the check. If the MICR codeline data from the check is unreadable as determined in step 114, then a check return operation is initiated. When this occurs, the transport mechanism 70 reverses the direction of transport (step 116) to convey the check to the check input/output slot 56 to return the check to the ATM customer via the check input/output slot. The controller 86 may monitor the slot 56 to ensure that the check has been removed by the ATM customer (step 118). If the ATM customer has not removed the check within a predetermined time period, the check is retracted and conveyed to the reject bin 82 (step 120).

However, if the MICR codeline data from the check is readable as determined in step 114, then the transport mechanism 70 transports the check to the imager 74, where both sides of the check are imaged (step 122). The printer 76 prints endorsement data onto the check (step 124). The check is then transported to the imager 74 to image the endorsed check (step 126) before it is transported to the storage bin 78 (step 128) for subsequent collection and further processing.

Although the above describes both steps 122 and 128 being performed, it is conceivable that only one of these steps be performed. Preferably, step 122 is performed, and step 128 is optionally performed. The check images captured in steps 122 and/or 128 are electronically transmitted to the back office facility of a financial institution (step 130). This financial institution may or may not own the particular ATM at which the check has been deposited.

Figure 5:
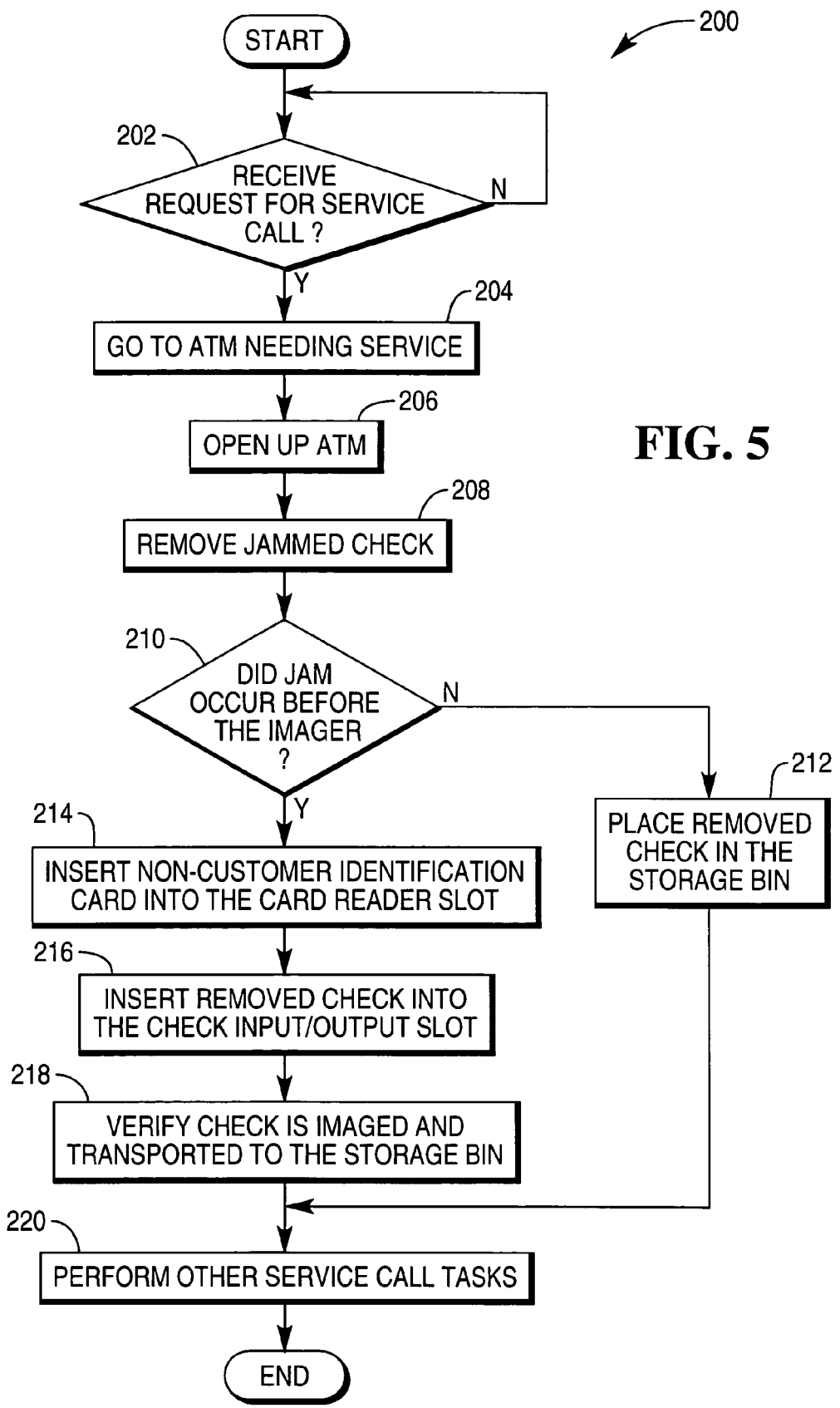
FIG. 5 is a flowchart illustrating steps performed by a responsible operator in a check jam clearing operation.

Referring to FIG. 5, a flowchart 200 which illustrates steps performed by a responsible operator in a check jam clearing operation. The responsible operator is not an ATM customer while performing the check jam clearing operation. The responsible operator may be a bank branch employee or an employee of a third party transit company, for examples. In step 202, the responsible operator awaits a request to make a service call for an ATM in need of service. The service call may come from a dispatch service or from an alert signal provided by the particular ATM in need of service. When the responsible operator receives a service call, the operator makes a trip to the particular ATM in need of service. In this case, the particular ATM in need of service is the ATM 10 of FIGS. 1–3. Also, in this case, the ATM 10 is need of service because of a check jam condition having occurred at the ATM.

When the responsible operator arrives at the ATM 10, the operator opens up the ATM (step 206) and removes the jammed check from the transport mechanism 70 (step 208). The responsible operator determines (step 210) whether the jammed check was removed from a location before or after the imager 74. If the responsible operator determines in step 210 that the check jam occurred after the imager 74, the operator places the check which has been removed from the transport mechanism 70 into the storage bin 78 (step 212). This is because the front and rear images of the removed check have been captured and, therefore, have been electronically transmitted to the back office facility before the check jam condition occurred. The removed check which has just been placed into the storage bin 78 will be picked up at a later time by normal courier pickup. The responsible operator then performs other types of routing service call tasks, as needed, before completing the service call (step 220).

However, if the responsible operator determines in step 210 that the check jam occurred before the imager 74, the operator inserts a non-customer identification card (step 214) into the card reader slot 52. This non-customer identification card has a physical construction substantially the same as the physical construction of an ATM customer identification card which is well known in the art. The non-customer identification card stores data which is used to "identify" the responsible operator as being an ATM user who is other than an ATM customer. The data stored on the non-customer identification card may include, for example, data which identifies the responsible operator as a bank branch employee or an employee of a third party transit company, and not as an ATM customer. The non-customer identification card allows the responsible operator to make a "deposit".

The non-customer identification card may also store data which is representative of a bank number or data which is representative of an account number of a "reconciliation account" for free network images of the financial institution. The reconciliation account is a specific account number used by the back office facility of the financial institution to reconcile exception items during exception processing. The reconciliation account may be associated with any number of ATMs. For example, the reconciliation account may be associated with thousands of ATMs on an ATM network.

After the responsible operator inserts the non-customer identification card into the card reader slot 52 in step 214, the operator inserts the check which has just been removed from the transport mechanism 70 into the check input/output slot 56 (step 216). The removed check is then processed in a manner as described hereinabove with reference to the check depositing operation of FIG. 4. Briefly, the removed check is imaged by the imager 74 and is transported by the transport mechanism 70 into the storage bin 78.

Figure 4A:
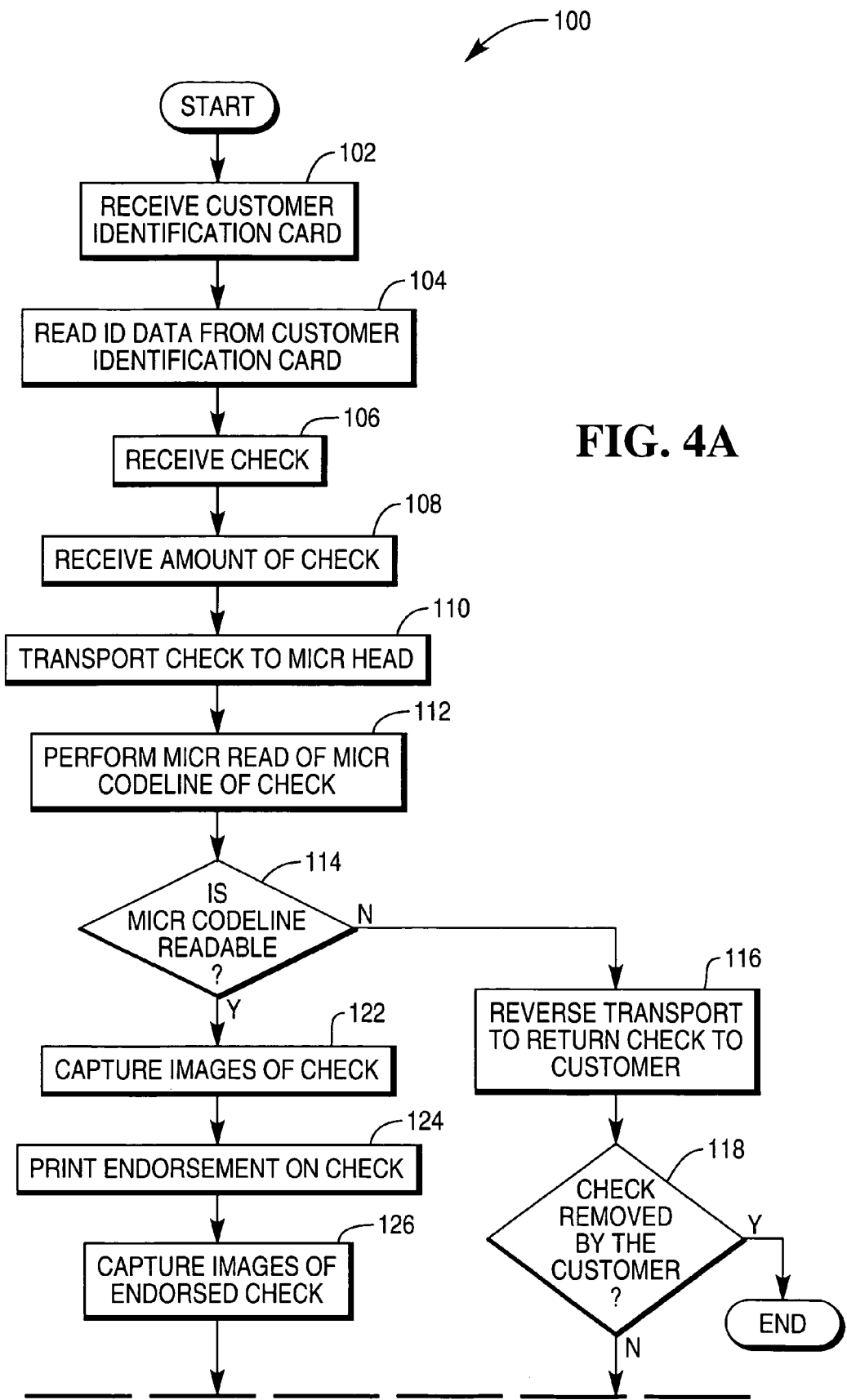
FIG. 4 is a flowchart illustrating steps involved in a check depositing operation.
Figure 4B:
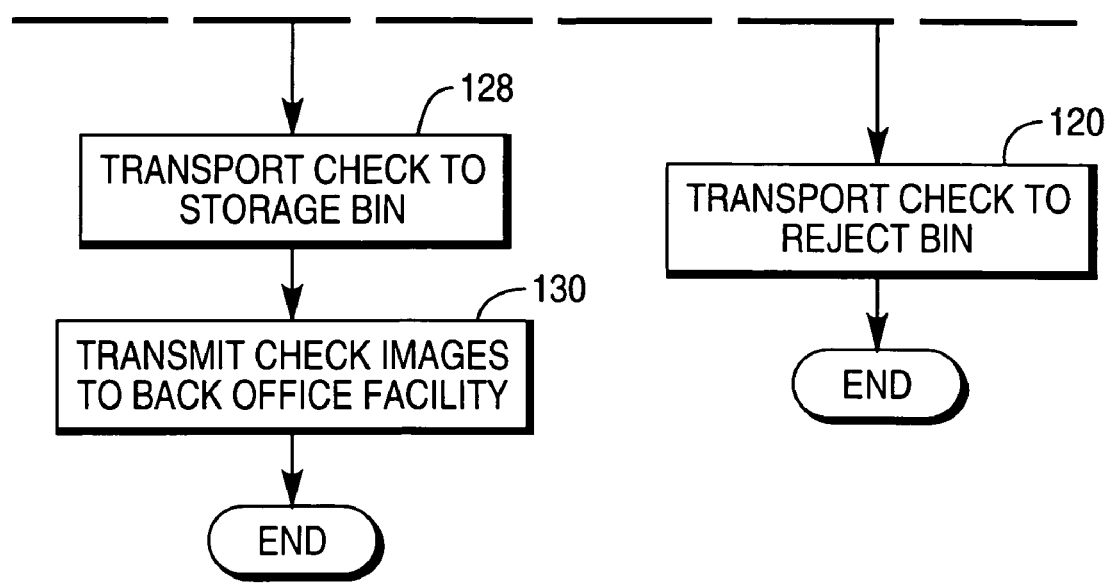

While the removed check is being processed in accordance with the check depositing process of FIG. 4, the captured check images may be associated with various data. For example, the captured check images may be associated with the terminal identification number of the particular ATM at which the document jam condition occurred. As another example, the captured check images may be associated with the time of day at which the document jam condition has been cleared. The captured check images are associated with data from the non-customer identification card. The captured check images and the associated data from the non-customer identification card (and including any other data which has been associated with the captured check images) are electronically transmitted together to the back office facility.

The data from the non-customer identification card allows personnel in the back office facility to later quickly identify the captured check images associated with the check which was removed by the responsible operator at the ATM 10 to clear the check jam condition. The personnel in the back office facility may need to later quickly identify the captured check images to reconcile an exception condition, for example. The responsible operator watches movement of the check along the transport mechanism 70 to verify that the check does not jam again and, therefore, has been imaged and transported to the storage bin 78 (step 218). The responsible operator then performs other types of routine service call tasks, as needed, before completing the service call (step 220).

Figure 6A:
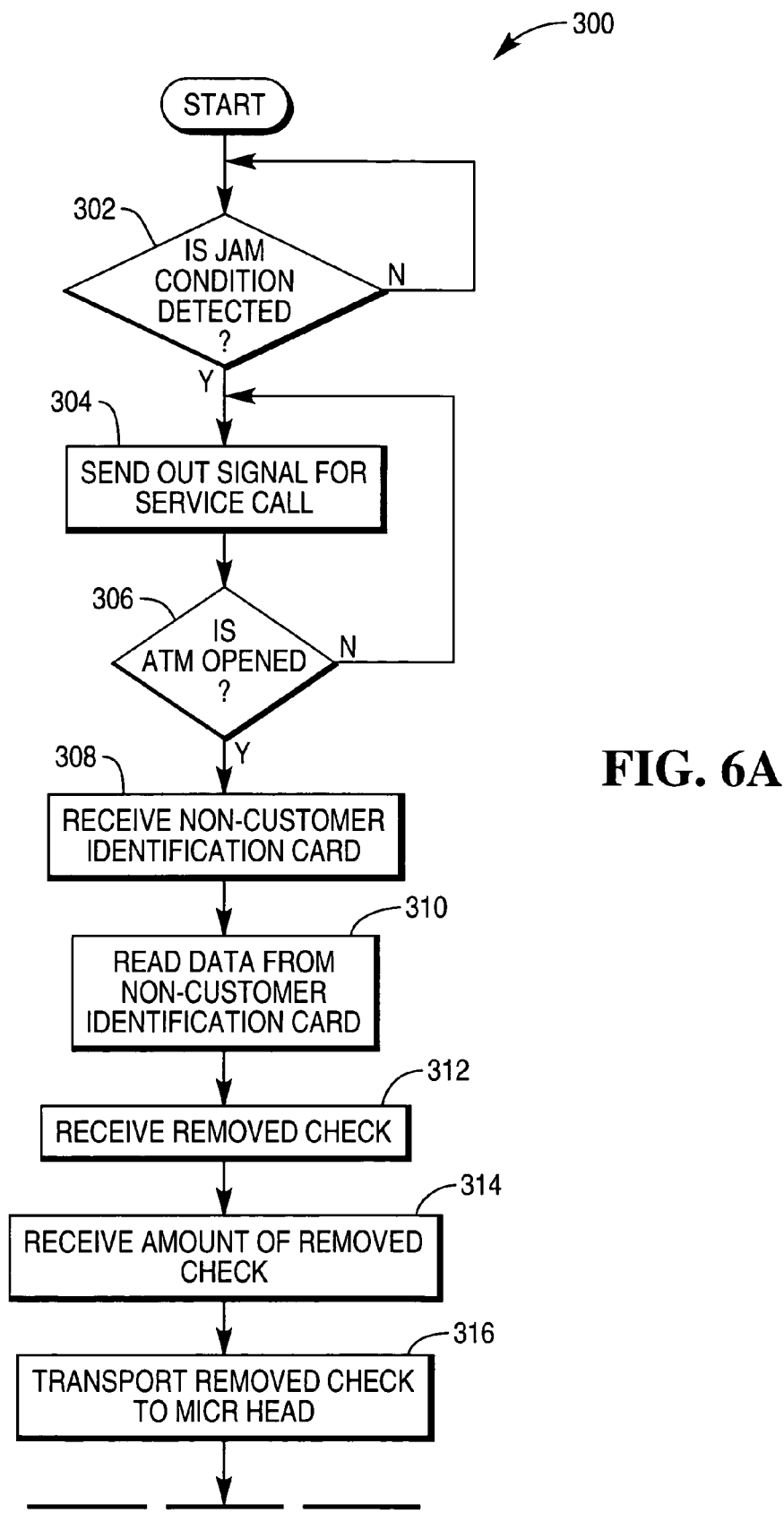
FIG. 6 is a flowchart illustrating steps performed by the ATM of FIG. 1 in a check jam clearing operation.
Figure 6B:
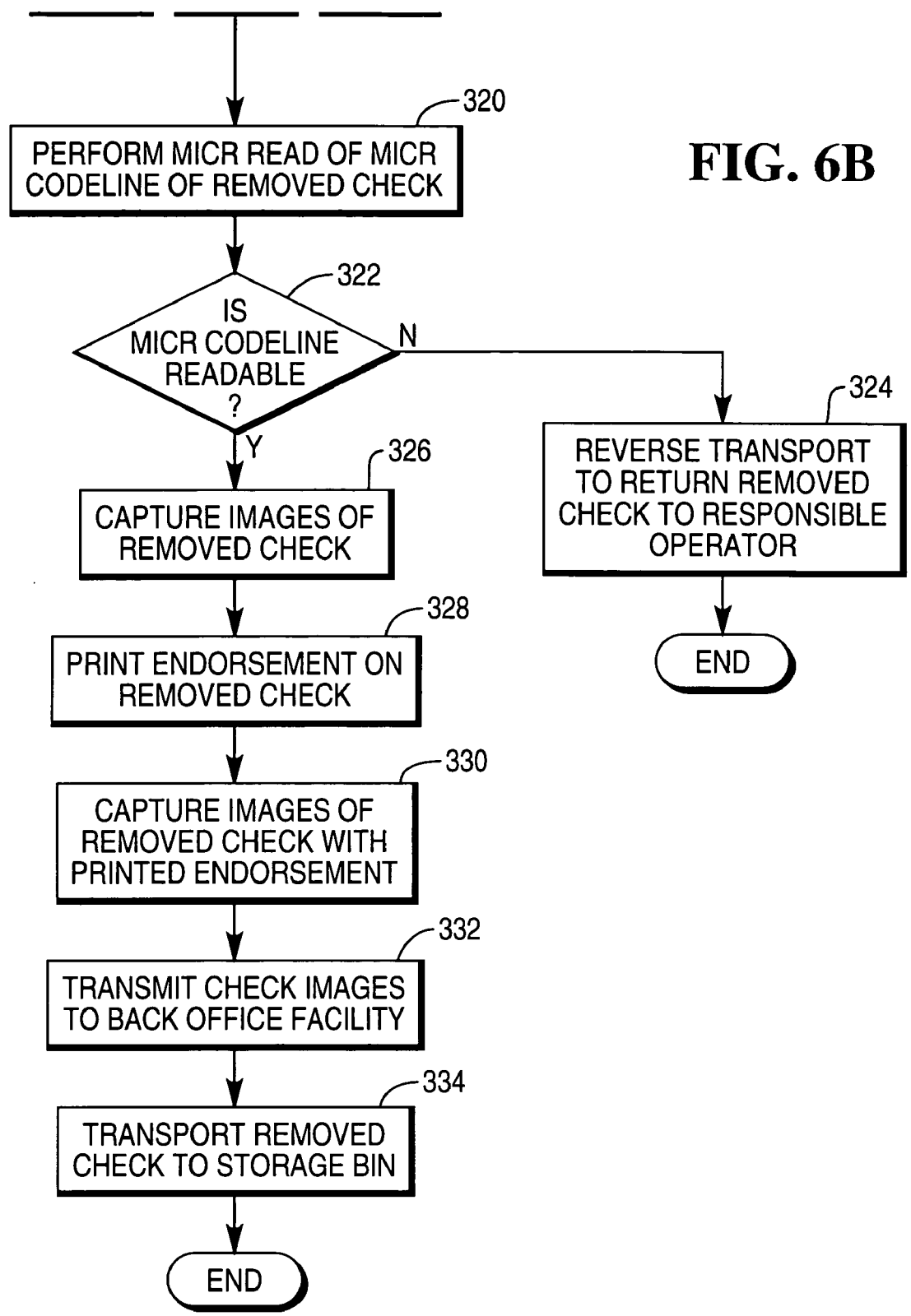

Referring to FIG. 6, is a flowchart illustrating steps performed by the ATM 10 of FIG. 1 in a check jam clearing operation. In step 302, the ATM 10 monitors itself for the occurrence of a check jam condition. When a check jam condition is detected, the process proceeds to step 304 to send out a signal for a service call to be made at this ATM. A determination is made in step 306 as to whether the ATM 10 is opened up which indicates that a service representative is responding to the service call. If the determination in step 306 is negative, the process returns to step 304 to continue sending out the signal for a service call. However, if the determination in step 306 is affirmative, the process proceeds to step 308 in which the non-customer identification card, as described hereinabove with reference to FIG. 5, is received through the card entry slot 52 from the responsible operator. Data from the non-customer identification card is read, as shown in step 310.

Then, as shown in steps 312, the removed check is received through the check input/output slot 56 from the responsible operator. Also, the amount of the removed check is received via the keyboard 34 from the responsible operator, as shown in step 314. The transport mechanism 70 receives the check and transports the removed check (step 316) to the MICR head 72 where the MICR codeline on the check is read (step 320).

A determination is made (step 322) as to whether the MICR codeline can be read from the removed check. If the MICR codeline data from the removed check is unreadable as determined in step 322, then a check return operation is initiated. When this occurs, the transport mechanism 70 reverses the direction of transport (step 324) to convey the removed check to the check input/output slot 56 to return the check to the responsible operator via the check input/output slot. At this point, the responsible operator may need to place the removed check into a special envelope and place the envelope into the reject bin 82 for subsequent pickup by normal courier pickup.

However, if the MICR codeline data from the removed check is readable as determined in step 322, then the transport mechanism 70 transports the check to the imager 74, where both sides of the removed check are imaged (step 326). The printer 76 prints endorsement data onto the removed check (step 328). The removed check with endorsement data thereon is then transported to the imager 74 to capture images thereof (step 330). The captured images are then electronically transmitted to the back office facility (step 332) as the check is transported to the storage bin 78 (step 334) for subsequent collection and further processing.

It should be apparent that a financial institution, such as a bank, associated with the ATM 10 can retrieve a jammed item and leave the retrieved item in the ATM. The responsible operator does not have to place the retrieved item in an exception process before the amount of the item can be eventually credited to the ATM customer associated with the particular item. The responsible operator simply needs to insert the retrieved item through the check entry/exit slot to process the item as described hereinabove. The result is that the retrieved item need not be placed through an exception process, and that the ATM customer is credited with the amount of the item without any further delay.

The construction and content of the non-customer identification card are described hereinabove by way of example only. It is conceivable that other types of non-customer identification cards may be used.

Although the above-description describes a fault condition at the ATM 10 as being a check jam condition, it is conceivable that the fault condition may be of another type. For example, the fault condition may be caused by the transport mechanism 70 becoming inoperative after the ATM customer has inserted a check through the check input/output slot 56 but before the check has had a chance to move past the imager 74 to have its image captured.

Although the above-description describes the PERSO-NAS (trade mark) 5878 NCR ATM embodying the present invention, it is conceivable that other models of ATMs, other types of ATMs, or other types of self-service terminals may embody the present invention. It is also conceivable that the self-service terminal may be any type of device in a publicly accessible, unattended environment, such as a check depositing ATM, a check depositing/cashing ATM, a check cashing ATM, or the like. Self-service terminals are generally public-access devices that are designed to allow a user to conduct a transaction or to access information in an unassisted manner and/or in an unattended environment. Self-service terminals typically include some form of tamper resistance so that they are inherently resilient. Self-service terminals allow users to obtain information or to conduct a transaction. Self-service terminals include: ATMs; non-cash kiosks that allow users to access information (e.g., to view reward points on a reward card the user inserts into the self-service terminal); and kiosks that accept payment for services (e.g. Web surfing kiosks, kiosks that allow users to buy goods, etc.). The term self-service terminal has a relatively broad meaning and includes vending machines.

Also, although the above-description describes a financial document in the form of a check being deposited, it is conceivable other types of financial documents may be deposited. Moreover, it is conceivable that non-financial documents may be deposited. Documents may be of different sizes, different thicknesses, or different weights of paper. Further, although the above-description describes a check being deposited in its entire amount by an ATM customer, it is conceivable that the check may be deposited only in partial amount of the entire amount of the check at the ATM 10, with the remaining amount of the check being cashed and delivered to the ATM customer.

The particular arrangements disclosed are meant to illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of an operator who is other than a check depositing customer handling a fault condition in an image-based check depositing terminal, the method comprising:
   inserting a non-customer identification card into a card reader of the terminal to allow the card reader to read from the card data which is associated with a financial institution;
   removing a check along a check transport path which extends between a check input slot and an image capture device of the terminal; and
   inserting the removed check into the check input slot to allow the check to be transported along the check transport path past the image capture device to capture an image of the check so that the image of the check can be electronically transmitted together with the data which is associated with the financial institution.

2. A method according to claim 1, further comprising:
   verifying that the check is transported into a check storage bin after the check has been transported past the image capture device.

3. A method according to claim 2, further comprising:
   removing the non-customer identification card from the card reader after the operator has verified that the check has been transported into the check storage bin.

4. A method according to claim 1, wherein the data which is associated with the financial institution comprises an account number of a reconciliation account for free network images of the financial institution.

5. A method according to claim 1, wherein the data which is associated with the financial institution comprises a bank number.

6. A method according to claim 1, wherein the data which is associated with the financial institution comprises data which identifies the operator as a bank branch employee.

7. A method according to claim 1, wherein the data which is associated with the financial institution comprises data which identifies the operator as an employee of a third party transit company.

8. A method of an operator who is other than a check depositing customer handling a fault condition in an image-based check depositing terminal, the method comprising:
   inserting a non-customer identification card into a card reader of the terminal to allow the card reader to read from the card data which is associated with the operator;

removing a check along a check transport path which extends between a check input slot and an image capture device of the terminal; and inserting the removed check into the check input slot to allow the check to be transported along the check transport path past the image capture device to capture an image of the check so that the image of the check can be electronically transmitted together with the data which is associated with the operator.

9. A method according to claim 8, further comprising:

verifying that the check is transported into a check storage bin after the check has been transported past the image capture device.

10. A method according to claim 9, further comprising:

removing the non-customer identification card from the card reader after the operator has verified that the check has been transported into the check storage bin.

11. A method according to claim 8, wherein the data which is associated with the operator comprises data which identifies the operator as a bank branch employee.

12. A method according to claim 8, wherein the data which is associated with the operator comprises data which identifies the operator as an employee of a third party transit company.

13. A method of a responsible operator who is other than a check depositing customer handling a document jam condition in an image-based check depositing terminal having a check transport path which extends between a check input slot and an image capture device which captures check images as checks are transported past the image capture device, the method comprising:

inserting an identification card into a card reader of the terminal to allow the card reader to read from the card data which is representative of an account number of a reconciliation account associated with a financial institution and data which is representative of the operator;

removing a check which has jammed along the check transport path between the check input slot and the image capture device; and inserting the removed check into the check entry slot to allow the check to be transported along the check transport path to the image capture device so that the image capture device can capture an image of the check for electronically transmitting along with the data which is representative of the account number of the reconciliation account associated with the financial institution and the data which is representative of the operator.

14. A method according to claim 13, further comprising:

verifying that the check is transported into a check storage bin after the check has been transported past the image capture device.

15. A method according to claim 14, further comprising:

removing the non-customer identification card from the card reader after the operator has verified that the check has been transported into the check storage bin.

16. A method according to claim 13, wherein the data which is associated with the operator comprises data which identifies the operator as a bank branch employee.

17. A method according to claim 13, wherein the data which is associated with the operator comprises data which identifies the operator as an employee of a third party transit company.

\* \* \* \* \*